Jan. 29, 1963     B. R. ROBERTS ETAL     3,075,546
SMALL HIGH PRESSURE REGULATOR
Filed May 2, 1960     2 Sheets-Sheet 1
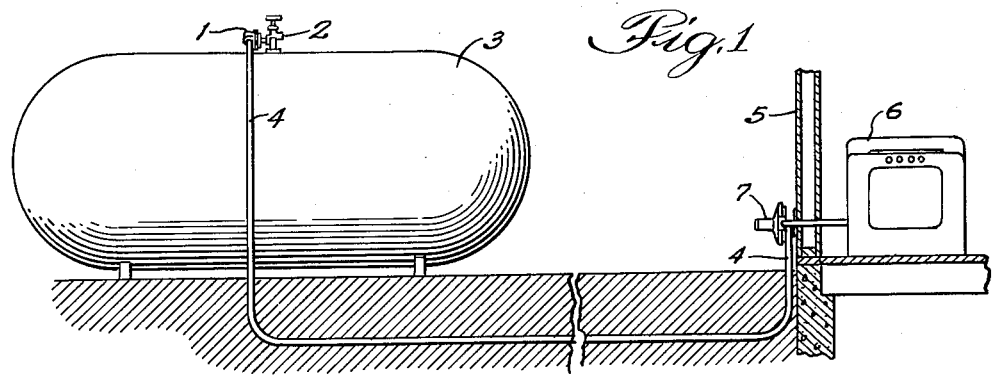
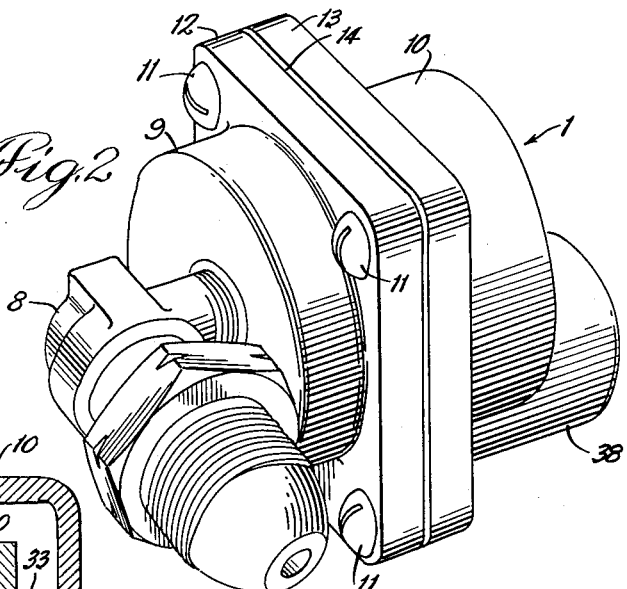
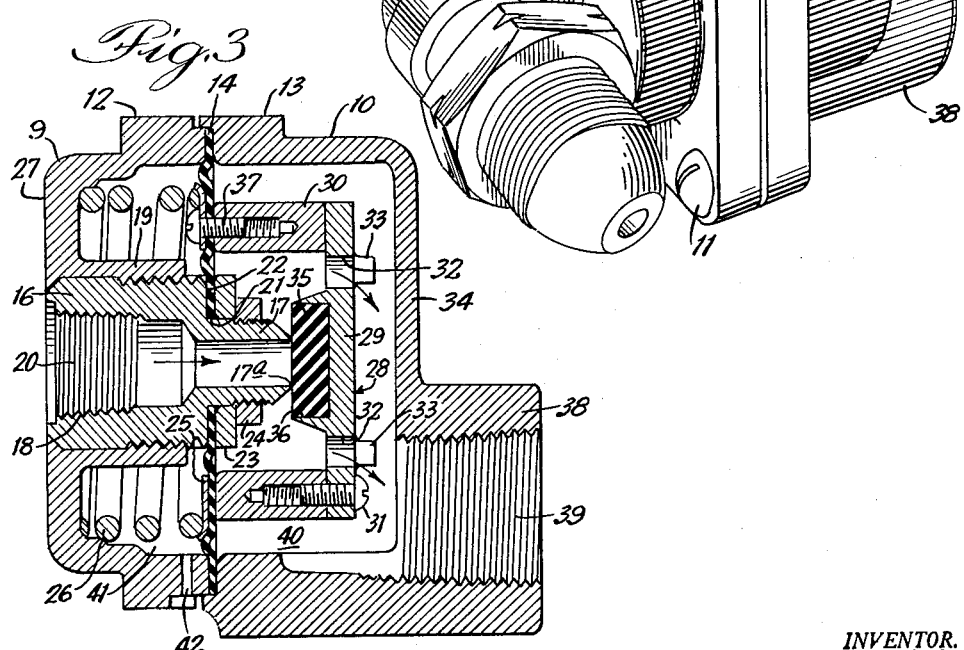
INVENTOR.
Bob R. Roberts and Donald W. Irwin,
BY
Bair, Freeman & Molinare
ATTORNEYS.

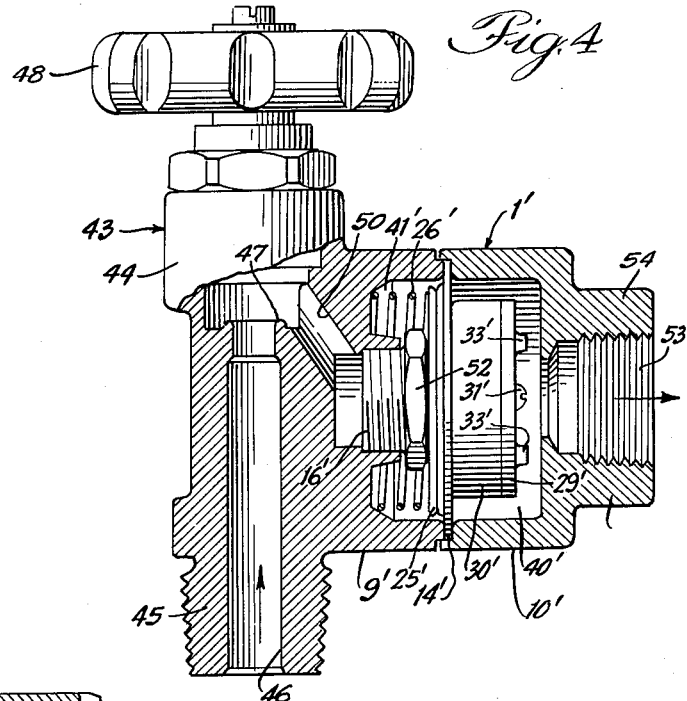
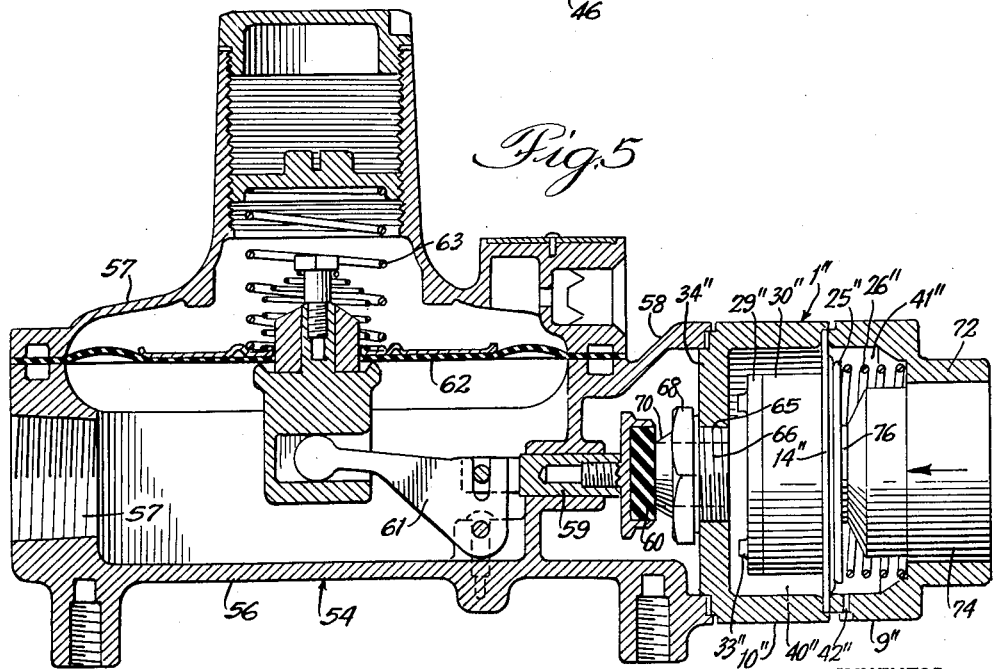

United States Patent Office 3,075,546
Patented Jan. 29, 1963

3,075,546
SMALL HIGH PRESSURE REGULATOR
Bob R. Roberts and Donald W. Irwin, Marshalltown, Iowa, assignors to Fisher Governor Company, Marshalltown, Iowa, a corporation of Iowa
Filed May 2, 1960, Ser. No. 26,258
2 Claims. (Cl. 137—505.25)

This invention relates generally to a pressure regulator, and more particularly to a small and compact, high capacity freeze-proof pressure regulator of novel construction, which is especially adapted for use as a first stage regulator for two-stage systems.

The rapid growth of the liquified petroleum gas (L.P.G.) industry has been characterized by a change from the use of relatively small supply cylinders of 20 pound and 100 pound size to large bulk storage tank installations. Because of local and federal restrictions on the physical location of large tanks, the need has arisen for the use of two-stage supply systems to avoid either excessive pressure drops or large low-pressure piping in the relatively long runs of pipe which are made necessary because of tank locations distantly remote from points of use. In addition, refinements in modern gas home appliances have made finer supply control a necessity.

In the past, two-stage systems have employed first stage regulators which are merely modifications of standard low pressure regulators, wherein basic production regulator parts are used and internal parts are strengthened where necessary to withstand operating stresses. The cost of such first stage regulators has necessarily been high, and the regulation obtained is "over-designed" for the job to be performed.

It is therefore, an important object of this invention to provide a low-cost, compact high-pressure regulator which is characterized by simplicity and economy in construction and installation, and which eliminates the operating difficulties encountered in prior constructions.

Another important object is to provide a regulator which has high capacity, reduces freeze-up problems, and provides high accuracy of supply pressure in two-stage system operation.

A further object is to provide a regulator which may be mounted simply by piping connections with no necessity for mounting brackets and the like, and which is of small size so as to enable compact installation at a bulk storage tank with a relatively small weather hood.

An additional object is to provide a small, high-pressure regulator having a relatively large orifice, but maintaining a relatively small orifice to diaphragm ratio so as to achieve an extremely compact design of small overall size, which is characterized by stability in operation.

These and other objects, advantages and functions of the invention will be apparent on reference to the specification and to the accompanying drawings, in which like elements are identified by like reference symbols in each of the views and in which:

FIGURE 1 is an illustration of a two-stage L.P.G. bulk storage installation showing the compact arrangement of the small, high pressure regulator of the present invention mounted with a separate service valve at the bulk storage tank as a first stage regulator, and a second stage regulator of the conventional large diaphragm type remotely mounted at a gas home appliance;

FIGURE 2 is a perspective view of a preferred embodiment of the small, high pressure regulator, with an angle connector joined thereto;

FIGURE 3 is a longitudinal cross-sectional view of the regulator of FIGURE 2;

FIGURE 4 is an elevational view, with parts broken away and in cross-section, of the regulator of the present invention provided within a unitary service valve vody; and FIGURE 5 is a longitudinal cross-sectional view of a further embodiment, illustrating the regulator of the present invention in adjacent combination with a conventional large diaphragm type regulator to provide a unitary two-stage system arrangement.

In the drawings, a preferred embodiment of a small, high pressure regulator constructed in accordance with the principles and features of the present invention is indicated generally by the numeral 1 in FIGURES 1–3. FIGURE 1 illustrates the regulator 1 mounted together with a conventional service valve 2 on a bulk L.P.G. storage tank 3. A supply line pipe or conduit 4 is connected to the regulator 1, and extends for a considerable distance to a building 5, where it is illustrated as supplying low pressure gas to a gas stove 6. A conventional low pressure gas regulator 7, as for example the type shown in D. W. Irwin Patent No. 2,895,501 or B. R. Roberts Patent No. 2,619,983, is mounted in the line 4 adjacent to the building 5 and the stove 6.

FIGURE 1 illustrates one manner in which the small regulator 1 may be used as a first-stage regulator by mounting with a separate service valve 2 of the tank 3 merely by means of direct piping connections. A relatively small weather hood, not shown, may then be used to cover the installation on the tank 3, in the well known manner. The regulator 1 may be connected to the service valve or other source of supply by conventional pipe fittings, such as the male angle inlet connector assembly 8 illustrated in FIGURE 2.

Referring now more particularly to FIGURES 2 and 3, the regulator 1 includes a two-part body comprising an inlet housing 9 and an outlet housing 10 assembled by means of screws or bolts 11 and cooperating peripheral flanges 12 and 13 extending laterally from the housings. A flexible, resilient diaphragm 14 is disposed between the housings and fixedly held at its periphery by the flange portions 12 and 13 in sealing engagement.

A tubular orifice plug 16 is mounted axially in the inlet housing 9 in serrated engagement with an inwardly extending sleeve portion 19 integrally provided by the housing. The orifice plug 16 is internally threaded at 18 to provide an inlet opening 20 for the reception of a pipe fitting, such as the connector assembly 8 of FIGURE 2. The orifice plug 16 provides a tubular extension 17 of reduced cross-section which extends through a central opening 21 of the diaphragm 14 into the outlet housing 10.

The extension 17 terminates in a relatively sharp annular seat 17a for sealing cooperation with a valve disc, as will be described. The orifice opening thus provided is preferably relatively large (for example, ¼ inch diameter in the design shown) so as to prevent freeze-up problems. An annular ledge or shoulder 22 at the base of the extension 17 of the orifice plug 16, approximately at the plane of junction of the housings 9 and 10 and their fixed mounting of the periphery of the diaphragm 14, cooperates with a washer 23 and lock nut 24 threaded onto the extension 17 to fixedly position the central portion of the diaphragm 14.

An annular ring 25 is mounted on the free intermediate portion of the diaphragm 14, within the inlet housing 9. A coil spring 26 is mounted in compression withn the housing 9 around the sleeve 19, between the closed end 27 of the housing 9 and the ring 25, thereby normally urging the diaphragm 14 toward the housing 10

A disc holder 29 and disc adapter 30 are assembled by screws 31 and disposed within the outlet housing 10. The disc holder 29 is provided with suitable flow openings 32, and with projecting stops 33 for limiting its movement by abutment against the closed end 34 of the housing 10.

A resilient valve disc 35 is mounted in a recess 36 formed by an annularly projecting flange at the inner face of the disc holder 29. The disc 35 is adapted to engage and seal against the valve seat 17a. Adapter mounting screws 37 extend through the ring 25 and the diaphragm 14 into threaded openings in the adapter 30. In this way, diaphragm movement serves to carry the disc holder 29 and to effect opening and closing valve action by the disc 35 and seat 17a.

An internally threaded boss 38 extends from the closed end 34 of the housing 10, to provide an outlet opening 39. In this way, the inlet opening 20 provides means for conventional piping connection to the service valve of the bulk tank, and the outlet opening 39 provides means for conventional piping connection to an extended supply line and a second-stage regulator, as indicated in FIGURE 1.

As the demand varies, the atmospheric pressure against the diaphragm 14 within chamber 41 is opposed by the pressure within chamber 40, causing the diaphragm 14 under the loading of the spring 26 to move correspondingly back and forth. For the design shown, outlet pressure will vary over a range of 5 to 15 p.s.i. with an inlet pressure change from 10 to 250 p.s.i. The small orifice to diaphragm ratio, the straight-through flow path and the freedom of selection of the relationship of the pressure volumes defined within the housings despite overall compactness of size, all contriubute to the achievement of operating stability.

A vent opening 42 is provided in the side wall of the housing 9. The small size of the regulator 1 permits it to be mounted by simple piping connections at the inlet 20 and outlet 39 with no need for mounting brackets or supporting fixtures. It is important, however, that the regulator body be oriented in space so that the vent opening 42 is positioned downwardly. This may be accomplished by locating the off-center outlet boss 38 at the lower side, as seen in FIGURE 3.

It is a highly important feature of the invention that the diaphragm 14 be mounted in the novel manner shown, wherein both the periphery and center are fixedly positioned within the regulator body so that all diaphragm movement takes place at the intermediate annular diaphragm area therebetween. It will become apparent that the internal regulator parts are thus "turned inside out" relative to conventional diaphragm regulator design, thereby enabling a path of fluid flow through the regulator 1 from the inlet opening 20 to the outlet 39 which is "in reverse" relative to the conventional pattern of flow through comparative prior diaphragm regulator constructions.

FIGURE 4 illustrates a regulator 1' which is embodied as a unitary portion of a service valve 43. The service valve includes a body 44 having an externally threaded inlet boss 45 and inlet bore 46. A main valve seat 47 is adapted to be controlled in conventional manner by a valve, stem and handle assembly 48. The service valve body 44 provides a valve outlet bore 50 within a lateral boss defining a housing 9' of the regulator portion 1' integrally with the body. The valve outlet bore 50 communicates with an inlet to the regulator provided by an orifice plug 16'. The orifice plug 16' includes an integral external nut portion 52, for removable mounting and locating thereof in position. The remaining details of internal construction of the regulator 1' are identical with the parts already described in connection with the regulator 1 of FIGURES 2 and 3, and will not be repeated except to note that like parts are designated by the same numerals with an added prime.

The service valve 43 is adapted for installing in place of the valve 2 illustrated in FIGURE 1 on a bulk tank. The fluid conduit 4 is connected in an internally threaded outlet opening 53 provided by a centrally aligned outlet boss 54 of the removable outlet housing 10'. One compact and unitary device is thus provided which serves to both open and close the fluid line from the tank, and effect first stage pressure reduction of the fluid.

A unitary two-stage pressure regulator assembly has been illustrated in FIGURE 5, and includes a first stage regulator 1" in accordance with the invention as already described, and a second stage regulator 54 of the conventional low pressure diaphragm type. The first-stage regulator 1" need not be again described, except to note that the identical parts of the regulator 1 of FIGURES 2 and 3 are designated by the same numerals in FIGURE 5 wih an added prime.

The second-stage regulator 54 comprises, in the well known manner, a valve housing 56 and a diaphragm casing 57. The housing 56 provides an internally threaded outlet 57 and a collar-like inlet boss 58. A valve operating member 59 carries a valve disc 60, and is actuated through a bell crank 61 by movement of a resilient diaphragm 62 having an adjustable spring loading means 63.

The regulator 1" provides a threaded opening 65 in its outlet housing end wall 34". An outlet orifice plug 66 is mounted within the opening 65, and may be adjustably positioned by an external nut portion 68. The plug 66 provides an extension terminating in a relatively sharp annular valve seat 70 which is adapted to effect sealing engagement with the cooperating valve disc 60 of the second stage regulator 54. The internal parts of construction of the regulator 1" are substantially identical with the corresponding embodiments already described. The inlet housing 9" has been formed with an external annular mounting flange 72 adapted to receive an inlet orifice plug 74 of somewhat larger diameter than the plug 16 previously described in FIGURES 2 and 3. The plug 74 provides an extension 76 forming the first stage valve seat in the same manner as the seat 17a previously described.

Each of the first stage regulator embodiments described are particularly characterized by a pressure reducing orifice or valve seat of relatively large size to minimize freeze-up problems. Likewise, in the embodiment of FIGURE 5, the outlet valve seat 70 may also be of relatively large size for the same advantage. Despite the small and compact size achieved by the present invention, the first stage regulator, both singly and in unitary combination with the second-stage regulator, has a large flow capacity.

Economy in first cost and in instalaltion is permitted by the extremely simple design, small size, and light weight. The body, disc adapter and disc holder may be formed of die cast aluminum, iridite treated for high corrosion resistance. The diaphragm and seat disc are of resilient materials particularly suited for L.P.G. service. The orifice plugs and cooperating service valve body parts may be of brass. The simplicity of design, with no friction-creating pivots or guides, and only six internal parts, results in a regulator which eliminates the operating difficulties found in prior conventional designs. The combination of the regulator of the present invention and any suitable good quality second-stage regulator produces the high accuracy of appliance pressure characteristic of proper two-stage operation. The compactness achieved as the result of the present approach to first stage regulator design provides a dependable first stage regulator with inherent economy of material and arrangement. The capacity of the first stage regulator is effectively limited only by the second stage regulator with which it is used, and is adequate for any second stage regulator having capacities up to 1,250,000 B.t.u./hr. or 500 c.f.h. propane.

It will be apparent that changes in the construction and arrangement of the parts described may be made while accomplishing the objects within the scope of the present invention. For example, cooperatively assembled parts illustrated as assemblies of several pieces for purposes of manufacturing convenience might also be constructed as unitary single parts without departure from the invention. The first stage regulator may be embodied in a variety of unitary fittings or bodies, and cooperatively assembled with a variety of second stage regulators, all within the scope of the present invention. The embodiments illustrated, therefore, are typical and preferable for reasons of performance, cost and manufacture.

The invention is hereby claimed as follows:

1. A small, high-capacity pressure regulator comprising a generally hollow body having an inlet and an outlet, each adapted to directly couple with pipe connector fittings, a flexible diaphragm peripherally secured within said body to define therewith an inlet chamber and an outlet chamber, said body having port means for venting said inlet chamber, the axis of said port means extending generally transversely to the axis of flow into said inlet chamber, fixed orifice-defining means extending from said inlet and centrally through said diaphragm into said outlet chamber and terminating in a relatively sharp annular valve seat, said diaphragm being centrally secured to said fixed orifice-defining means so that pressure responsive movement thereof is limited to an intermediate annular diaphragm area between said orifice-defining means and the periphery of said diaphragm, said orifice having a large area with respect to said annular diaphragm area, coil spring means operative within said inlet chamber to bias said diaphragm toward said outlet chamber, a valve disc holder carried by said movable diaphragm area within said outlet housing independently of said orifice-defining means and a resilient valve disc secured to said valve disc holder and movable therewith to open and close said valve seat.

2. A small, high-capacity pressure regulator comprising a generally hollow body having an inlet and an outlet, a flexible diaphragm peripherally secured within said body to define therewith an inlet and an outlet chamber, said body having port means for venting said inlet chamber, the axis of said port means extending generally transversely to the axis of flow into the inlet chamber, fixed orifice-defining means extending from said inlet and centrally through said diaphragm into said outlet chamber and terminating in a relatively sharp, annular valve seat, said diaphragm being centrally fixed to said fixed orifice-defining means so that pressure responsive movement thereof is limited to an intermediate annular diaphragm area between said orifice-defining means and the periphery of said diaphragm, the area of the orifice being large with respect to said intermediate annular diaphragm area, coil spring means disposed in said inlet chamber to bias said diaphragm toward said outlet chamber, a valve disc holder carried by said movable diaphragm area within said outlet housing independently of said orifice-defining means, a resilient valve disc connected to said valve disc holder and movable therewith for opening and closing said valve seat, and stop means on said valve disc holder within said outlet chamber for limiting the movement of said valve disc from said valve seat.

References Cited in the file of this patent

UNITED STATES PATENTS

| 1,354,311 | Landrum | Sept. 28, 1920 |
| 1,731,519 | Bastian | Oct. 15, 1929 |
| 1,927,669 | Morrow | Sept. 19, 1933 |
| 2,642,701 | Goodner | June 23, 1953 |
| 2,746,479 | Krow | May 22, 1956 |
| 2,861,588 | Cronk | Nov. 25, 1958 |
| 2,918,079 | Krow | Dec. 22, 1959 |
| 2,935,083 | Singer | May 3, 1960 |

FOREIGN PATENTS

| 598,083 | France | Sept. 16, 1925 |